United States Patent
Colussi et al.

(10) Patent No.: US 6,595,499 B2
(45) Date of Patent: Jul. 22, 2003

(54) EVAPORATING UNIT FOR AN AIR ACCLIMATIZER

(75) Inventors: Rafael A. Colussi, Guadalupe Norte-Santa Fe (AR); Néstor J. Vénica, Guadalupe Norte-Santa Fe (AR)

(73) Assignee: Col-Ven S.A., Guadalupe Norte-Santa Fe (AR)

(*) Notice: Subject to any disclaimer, the term of this patent is extended or adjusted under 35 U.S.C. 154(b) by 0 days.

(21) Appl. No.: 09/728,645

(22) Filed: Dec. 1, 2000

(65) Prior Publication Data

US 2002/0066969 A1 Jun. 6, 2002

(51) Int. Cl.$^7$ ................................................ B01F 3/04
(52) U.S. Cl. ..................... 261/30; 261/102; 261/105; 261/DIG. 4; 454/138; 454/157
(58) Field of Search ................. 261/29, 30, 102, 261/103, 105, 106, DIG. 3, DIG. 4, DIG. 43; 454/110, 138, 143, 151, 157

(56) References Cited

U.S. PATENT DOCUMENTS

| | | | | |
|---|---|---|---|---|
| 33,565 A | * | 10/1861 | Beardsley | 261/106 |
| 2,620,722 A | * | 12/1952 | Owens | 261/106 |
| 3,080,807 A | * | 3/1963 | Barenyi | 454/138 |
| 3,524,398 A | * | 8/1970 | Winfrey | 261/30 |
| 3,738,621 A | * | 6/1973 | Anderson | 261/29 |
| 3,834,680 A | * | 9/1974 | Yost et al. | 261/DIG. 4 |
| 3,867,486 A | * | 2/1975 | Nagele | 261/106 |
| 3,978,174 A | * | 8/1976 | Peer | 261/DIG. 4 |
| 4,094,935 A | * | 6/1978 | Walker et al. | 261/DIG. 4 |
| 4,835,982 A | * | 6/1989 | Ferdows | 261/DIG. 4 |
| 5,112,535 A | * | 5/1992 | Roberson | 261/106 |
| 5,544,929 A | * | 8/1996 | Nagai | 454/138 |

FOREIGN PATENT DOCUMENTS

AR          0235114          7/1987

* cited by examiner

Primary Examiner—C. Scott Bushey
(74) Attorney, Agent, or Firm—Davidson, Davidson & Kappel, LLC

(57) ABSTRACT

An evaporating unit whose cabinet incorporates an external hot air intake for its acclimatization is disclosed. The external air intake is located in the base of the cabinet and has grids arranged around the three sides of the base, that is to say a grid close to the front edge and two grids following the two side edges of the base of the cabinet.

4 Claims, 1 Drawing Sheet

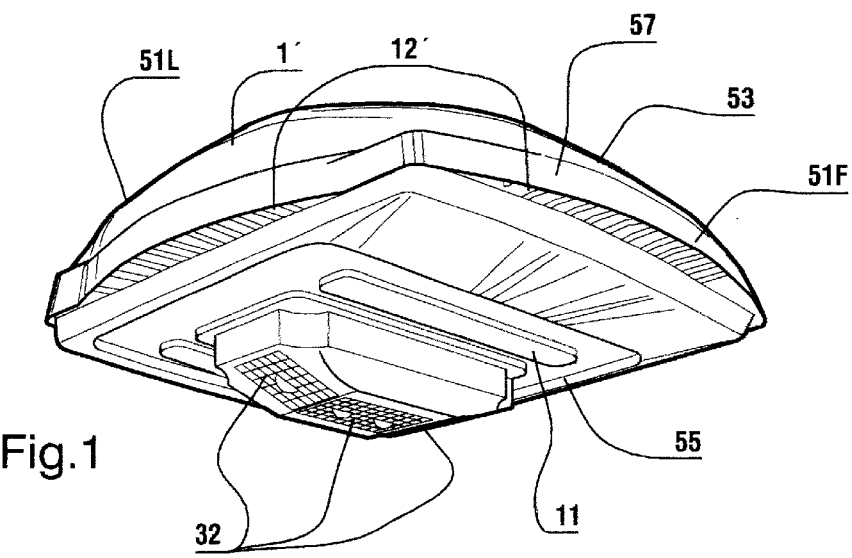
Fig.1
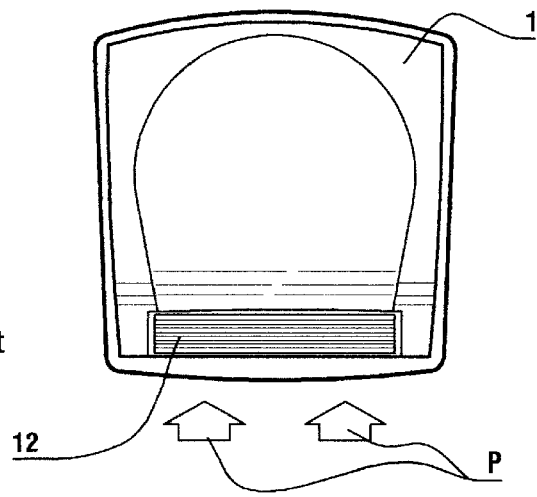
Fig.2
Prior art
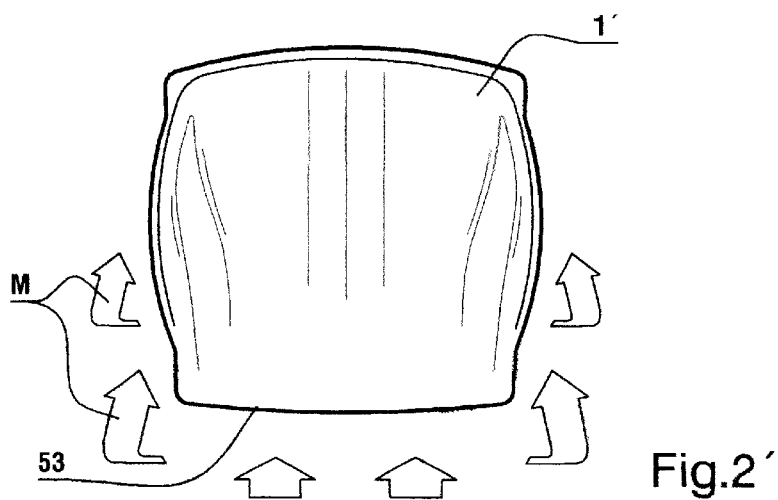
Fig.2´

EVAPORATING UNIT FOR AN AIR ACCLIMATIZER

FIELD OF THE INVENTION

This invention refers to the climatization of short, medium and long distance transport vehicle cabins for passengers and cargo, such as trucks, minibuses, as well as road-building and agricultural machinery and other means of locomotion. More particularly, it refers to an evaporating unit of the type which is mounted on the roof of the cabin and is provided with an external air intake, which is cooled and circulated inside the cabin. The cooling is generally carried out by passing the air through a radiator/evaporator made from a porous material which is kept humid, which fulfills the double function of thermal exchanger, taking heat from the air, and humidifier, which gives the sensation of the air having been cooled. The cabin is cooled by the lower temperature of the climatized air and by the evaporation of the humidity which comes in with the air. This invention refers specifically to the hot air intake for the evaporator.

These units are attractive due to their cost and lower maintenance compared with the traditional air conditioning units, furthermore they do not require to take any energy from the engine of the truck, which signifies likewise an operative saving as well as not reducing the available power of the transport vehicle for its own locomotion.

These air acclimatizers may also be adapted to other uses, such as transitory or precarious living quarters, for example, workshops. The advantage in these static installations is the avoidance in the use of compressors and the electrical consumption.

STATE OF THE ART

Acclimatizers of the type described in the previous section are known on the market. These units have a water deposit an a pump which circulates the water towards the evaporator in order to keep it humid. An electric ventilator sucks hot air through the intake, sucking it through the evaporator, where it is conditioned, giving up heat and absorbing humidity, prior to ventilating the climatized air towards the interior of the cabin.

These units are commercial successful due to their simplicity and the advantages already mentioned. Argentina Patent No. 235,114 and U.S. Pat. No. 3,867,486 describe acclimatizers with those characteristics. In both of the aforementioned patents, the evaporating unit comprises a plastic cabinet adapted for mounting on the roof of a cabin. The external air intake is made up of a grid positioned on the front of the cabinet, through which the hot air is sucked through an evaporator, the cooled air leaving through a gorge depending down from the base of the cabinet and into the cabin, through an orifice which has been made in the roof.

The cooled air which enters the cabin is relatively noisy and it has been discovered that important part of the noise transmitted by the air to the interior of the cabin comes from its passage through the intake grid in the front part of the aforementioned evaporating unit. The problem with this level of noise is aggravated by the higher speed of the modern trucks compared to previous models.

It has also been observed that the frontal flow of incoming air, because it is direct, is prone to encourage the entry of bugs and particles into the air intake, which is equipped with a filter. The accumulation of bugs and dirt trapped by the filter obstructs it progressively, reducing the cooling effect of the acclimatizer. The bugs and particles that get by the filter, due to their size, enter the cabin, which is disagreeable to the driver and occupants.

SUMMARY OF THE INVENTION

It has been found that this level of noise can be substantially reduced by intaking the air to be conditioned through the base of the unit. This solution has the added advantage of reducing the entry of bugs and particles to the intake.

In pursuit of these objectives and advantages, this invention comprises an evaporating unit for an acclimatizer whose front is substantially closed, thus avoiding the generation of noise due to the frontal intake of air against the conventional grid/filter system, wherein the air intake is placed in the base of the cabinet. Suitably, the air intake is made up of a grid arrangement distributed around the base of the cabinet, preferably surrounding the gorge which connects it to the cabin.

In addition to achieving a significant reduction of air noise in the cabin, which has been the main concern which has been addressed in the development of the invention, the preferred arrangement makes the air intake in the base surround the evaporator, increasing the flow surface through the porous tubular wall, resulting in a better use of and efficiency in the functions of cooling and humidifying the air.

BRIEF DESCRIPTION OF THE DRAWINGS

These and other characteristics and details of the object of this invention and the way in which it can be developed, implemented and put into practice can be better understood through the following detailed description of an example of an embodiment which is illustrated in the accompanying drawings, where:

FIG. 1 is a perspective view seen from beneath of an evaporating unit which forms part of an acclimatizer, in accordance with a preferred embodiment of this invention.

FIGS. 2 and 2' are upper plan views of an evaporating unit like the ones of the aforementioned patents and of the acclimatizer of FIG. 1, respectively, comparatively representing the entry flow of hot air.

PREFERRED EMBODIMENT OF THE INVENTION

The evaporating unit for the acclimatizer represented in FIG. 1 comprises a generally flat cabinet 1' of plastic material whose base 55, of generally quadrangular shape, centrally presents a gorge 11 adapted to project through an opening in the roof of the cabin (not illustrated). In its lower portion, the gorge 11 terminates in grids 32 with deflectors. The hot air to be conditioned enters the evaporating unit through an air intake 12', whose arrangement is detailed later on. This air is sucked through an evaporator, which is not detailed as it is not pertinent to the essence of this invention. It is enough to clarify that the evaporator can be considered as the fundamental component within the cabinet 1', which is formed by a tubular porous body which occupies a significant part of the interior of the cabinet and is maintained humidified through an appropriate homogeneous distributor system. The passage of hot air evaporates the water which comes unit from the evaporator body, the air leaving cooled and humidified, that is to say conditioned or climatized, by the deflectors 32 positioned in the roof of the cabin. The deflectors 32 allow regulation of the flow towards the driver and the passenger seat.

In accordance with the invention, the air intake 12' comprises a grid arrangement 51 (F-L) generally horizontally distributed, in a substantially perimetrical manner, about the base 55 of the cabinet 1'. Suitably, the arrangement 51 comprises three horizontal grids formed with the same material as the base 55 or the cabinet 1', (that is to say) a front grid 51F adjacent to the front edge 57 of the base 55 and two side grids 51L respective to the sides, continuing the ends of same. The front 53 of the cabinet 1' is substantially blind, unlike what happens with the cabinets of conventional cabinets, where the air enters frontwise, as shown by arrows P in FIG. 2.

In the improved acclimatizer of the invention, the hot air to be climatized is taken from the periphery of the cabinet 1, mainly from the air which flows between the base 55 of the cabinet 1' and the roof of the cabin. As illustrated in FIG. 2', the effective section of the air intake is greater than in the previous case and the air enters from multiple directions, as indicated by arrows M.

It has been observed, through trials, that the level of noise within the cabin with the acclimatizer in operation, that is to say the noise transmitted by the climatized air itself, is substantially lower than in the known units. Likewise, in virtue of the fact that the air enters in multiple directions M, the concatenation of the flow of air through the evaporator is helped. It is likewise observed that the entry of bugs and disagreeable particles brought in by the air into the cabin is lower. This second effect would be due to the change in direction of the air before entering the cabinet 1', making the heavier foreign particles pass through without entering the grids 51.

There is no doubt whatsoever that diverse modifications, variants and/or attachments can be added to the above described embodiment, without altering the nature or departing from the spirit of the invention, by adapting it for example to other applications different from those of trucks.

What is claimed is:

1. An evaporating unit for acclimating air inside a vehicle cabin having a generally horizontal roof, the evaporating unit comprising:

an evaporator for humidifying air flowing therethrough, air outlet adapted to project brought said roof for passing humidified air from said evaporator into said vehicle cabin;

a cabinet for mounting on said roof, said evaporator housed within the cabinet; said cabinet including a front generally facing the relative flow of air towards said vehicle and a substantially horizontal base adapted to face said cabin roof, said base including a front edge adjacent said cabinet front; wherein:

said front is substantially blind or closed and said base is provided with an intake for sucking in external air from between said base and said roof and towards said evaporator, said external air being made to change direction in order to enter said intake.

2. An evaporating unit in accordance with claim 1, wherein said external air intake is made up of a grid arrangement located in said cabinet base at least partly surrounding a gorge which communicates with said evaporator within the cabinet.

3. An evaporating unit in accordance with claim 2, wherein said grid arrangement is made up of a front grid close to said front edge of the base and two side grids in the respective sides of the base.

4. An evaporating unit in accordance with claim 3, wherein said front and side grids are part of said cabinet base.

* * * * *